United States Patent [19]

Chapman

[11] 4,300,477
[45] Nov. 17, 1981

[54] AQUACULTURE REARING SYSTEM

[75] Inventor: Paul W. Chapman, Derry, N.H.

[73] Assignee: Sanders Associates, Inc., Nashua, N.H.

[21] Appl. No.: 232,922

[22] Filed: Feb. 9, 1981

Related U.S. Application Data

[60] Continuation of Ser. No. 99,364, Dec. 3, 1979, abandoned, which is a division of Ser. No. 918,886, Jun. 26, 1978, Pat. No. 4,198,924.

[51] Int. Cl.³ .............................................. A01K 63/00
[52] U.S. Cl. ......................................................... 119/2
[58] Field of Search .............................. 119/2, 3, 4, 18

[56] References Cited

U.S. PATENT DOCUMENTS

| | | | |
|---|---|---|---|
| 3,565,043 | 2/1971 | Carmouche | 119/2 |
| 3,727,579 | 4/1973 | Lee | 119/2 |
| 3,741,159 | 6/1973 | Halaunbrenner | 119/2 |
| 3,765,374 | 10/1973 | Kolste | 119/18 |
| 3,815,546 | 6/1974 | Plante | 119/2 |
| 3,916,834 | 11/1975 | Buss | 119/3 |
| 4,007,709 | 2/1977 | Wishner | 119/2 |

*Primary Examiner*—Hugh R. Chamblee
*Attorney, Agent, or Firm*—Louis Etlinger; Richard I. Seligman

[57] ABSTRACT

An aquaculture rearing system for improving space utilization and yield is disclosed in which clustered, vertical rearing tanks are provided with individual stacked habitats in the form of baskets attached to a strongback member which houses a removable feeding rod, in which the baskets are quickly detachable through the use of interlocking detents and in which nestable baskets are utilized for different sized animals. Progressive space increments to match growth are provided by two different size baskets and removable dividers. Overflow water is skimmed by a skimmer which surrounds the entire top of each tank to prevent bacteriologic contamination of the water within the tank. The staggered modular mounting produces a tripod-like stability even though each tank has a single leg, and provides visibility and density. An overhead materials handling system is used in which the animals are protected by a fog to prevent gill malfunction. Animal health and growth is monitored by an electronic scanning device which records the amount of food consumed by each animal involved over a period of time and compares performance with predetermined standards.

12 Claims, 18 Drawing Figures

AQUACULTURE REARING SYSTEM

This is a continuation of application Ser. No. 099,364, filed Dec. 3, 1979, now abandoned, which is a division of application Ser. No. 918,886 filed June 26, 1978, now U.S. Pat. No. 4,198,924.

FIELD OF INVENTION

This invention relates to aquaculture and more particularly, to an improved apparatus for the rearing of aquatic animals such as crustaceans or animals requiring physical separation during growth.

BACKGROUND OF THE INVENTION

In order to raise aquatic animals which are by nature carnivorous and thus require separation during growth, it is important not only to separate the animals, but also to provide a system in which the animals can be properly cared for, provided with adequate food, and provided with fresh water and air on an efficient basis. Crustaceans and more particularly, lobsters, are difficult to raise in captivity due to a number of problems mainly related to the cost of the rearing and the health of the animals which obviously impacts on yield.

It will be appreciated that lobsters and most crustaceans are very delicate animals to rear, mainly because of bacteriologic infections such as gafkemia. Gafkemia invades the bloodstream via wounds which the animals may suffer as a result of attacks by other animals or as a result of handling. Moreover, infection can be aggravated by inadequately cleaned habitats and the non-availability of fresh air and water. Contaminated water or water not in sufficient supply and not sufficiently aerated will cause an early demise to a large portion of the animal population when raised intensively in habitats. Additionally, with each incident of direct contact handling, the animals are subjected to stress and trauma which can directly kill the animals, impair their growth, or encourage other infections.

Thus, it is desirable to provide an improved animal rearing habitat and system which minimizes the direct handling of the animals, does not subject them to trauma, provides adequate water management and quality and in general, provides an efficient system for the rearing of the animals.

In the past, there have been numerous systems for rearing crustaceans which systems either raise the animals in cages in their natural sea habitats or provide tanks for the rearing of these animals such as that described in U.S. Pat. No. 3,815,546 issued to Emile A. P. Plante on June 11, 1974.

As the rearing of animals in their natural environment, it will be appreciated that the majority of the systems which utilize cages utilize them in a lobster pound which freezes over in the winter. Thus, there is little or no accessibility to the animals within the pound during a large portion of the year. Typically, the success of such an operation also depends on the absence of disease, it being understood that once a diseased animal is present, he may infect the rest of the animals within the pound, and thus all or many of the animals in the pound may be lost, especially in winter when they are inaccessible because of ice and can't be serviced.

With respect to the Plante type habitat, it will be appreciated that the habitat compartments are formed by the cooperation of shelves or discs with the inner wall of the tank. While this is satisfactory in some aspects, it will be appreciated that if the disc assembly is withdrawn to remove an animal, all the animals fall off the discs, and thus must all be individually handled to access only one animal. Moreover, there may be contamination of these habitats by virtue of bacteria in the air which settles on the surface of the water at the top of each tank. This generally causes an annular ring of algal growth within the tank which attracts bacteria and presents a severe health problem.

It will be appreciated, from the Plante patent, that the base is either welded or adhesively attached to the cylindrical tank which results in stress corrosion of the super adjacent surfaces, and early material failure resulting in leakage and other maintenance problems. Moreover, because of the flat bottom, cleaning of the tank is impossible without removing the animals. Additionally, the tank walls must be made exceedingly thick in order to be able to accommodate the welding and bonding operations.

In general, tank type aquaculture systems require manual handling of animals during cleaning operations, animal, transfer, or animal removal. Moreover, animal health is ascertained by inspection of each animal after it has been removed from its habitat. Additionally, the animals, when transferred are, in general, kept in a water bath to keep them alive. This requires a tremendous amount of space and handling which, in general, is awkward, costly and detrimental to the animals' health.

In the subject system, a novel type of habitat is utilized in which nested baskets take the place of the animal rearing chambers of the Plante patent. Moreover, they are removably attached to a strongback fixture which maintains the baskets in their stacked arrangement either within the tank or during overhead transit. The removal of the animals is thus quickly and efficiently done without damage to, or handling of animals not involved in the transfer.

The basket structure is such that for large animals, the basket is undivided, with one basket on the top of another basket forming a top to keep the animal in the next immediate lower basket in place. Food is delivered through the strongback member by apertures therethrough which expose a feed rod which has compartments containing food. When the feed rod is in place, the apertures in the feed rod are in alignment with the apertures in the strongback member and also an aperture in the wall of the basket such that the animal may have access to the food in the feed rod. There is sufficient "draft" to the basket to allow easy attachment or removal from the strongback. For smaller animals, so-called "half baskets" are provided which are nestable and are provided with a shelf-like structure which permit twice as many animals access to a single feed rod thereby minimizing the space of rearing of animals of a predetermined size. For even smaller animals, this shelf containing half basket is further subdivided by a simple divider so that two animals can be raised in each half basket.

The tanks in general are modular in nature and have a tripod-type foot which permits a staggered arrangement of the tanks for easy visibility and animal surveillance. Each tank is made of a thin-walled cylinder with top and bottom circumferential restraint. The wall thickness is thus only that which is necessary to restrain the water column in hoop stress. The bottom of the tank is press fit into a frusto conical type tapered base member which contains a flushing valve for the removal of detritis and cleaning of the tank. This flushing system is designed to remove heavy sedimentary waste material. For lighter particulate matter, this matter is carried upwardly by the upward action of air lift circulation due to aerator bubbles which move upwardly and expand in their travel towards the top of the tank where they are carried away by the skimmer. Water flow is also in an upward direction. A skimmer which completely surrounds the top of the tank is employed so as to remove the light particulate matter. The skimmer, by virtue of its surrounding the entire top of the tank, prevents airborne bacteria and other contaminants from entering the tank which is a major factor in the prevention of disease.

An overhead conveyor type transfer system is utilized when either the feed rods are removed for replenishment or animals are loaded or harvested. When the animals are removed from the tank by virture of the raising of the strongback member, a fog chamber is provided to maintain moist gill surfaces so that the animals do not suffocate during their travel from one position to another in this production system. It is a finding of this invention that moist air or fog is sufficient to keep the animals alive for long periods of time and thus, the animals need not be immersed in water during transfer.

Additionally, animal health and growth is monitored by ascertaining the amount of food eaten by each lobster each day. The amount of uneaten food remaining in the feed rod is measured and indicates the relative health and/or growth of the animal. In one embodiment, a fixed scanner is utilized to scan the feed rods as they pass the scanning head prior to their being replenished. The amount of food left is correlated with the particular feed rod, tank, and compartment, and therefore, a particular animal. In this manner, the size, weight and physical condition of the animals may be monitored without physically removing them from the habitat or without attempting to measure them by visual inspection through the transparent tank walls. Thus, a constant watch can be kept on all of the animals to prevent disease, and in general, to monitor growth of the animals.

What has been solved by the utilization of this improved animal rearing system is the provision of a material handling system which is efficient and which does not subject the animals to undue stress. Moreover, water quality is easily maintained and animal separation is insured by use of the basketlike structure. Modularity of the tanks and their mounting system provides an unusually dense but flexible configuration for the rearing of the animals as well as visibility of all of the animals within the habitats. The above system increases serviceability and efficiently provides for any mix of animals of different sizes. This enables operation at 100% capacity at all times.

It is therefore an object of this invention to provide an improved aquaculture rearing system;

It is another object of this invention to provide an improved habitat design and materials handling system for the efficient raising of aquatic animals;

It is yet another object of this inventon to provide an improved animal monitoring system in which the health and size of the animals are monitored indirectly by monitoring the amount of food consumed in a given time period;

it is a still further object of this invention to provide for the safe transit of animals by the utilization of a fogging system in which the fog surrounds the animals during transit and promotes respiration.

These and other objects will be better understood in light of the following specification taken in conjunction with the dependent drawings wherein:

DETAILED DESCRIPTION

In order to obtain the aforementioned high yield rearing system, it is important to have a highly efficient, dense, easily cleanable and easily serviceable habitat in which to grow the animals. The habitat must not only permit high density, but also should be made of inexpensive materials so that the cost of rearing is minimized. Additionally, as mentioned hereinbefore, the habitats should be configured so as to maximize disease prevention and enable quarantine when required.

Figure 1A:
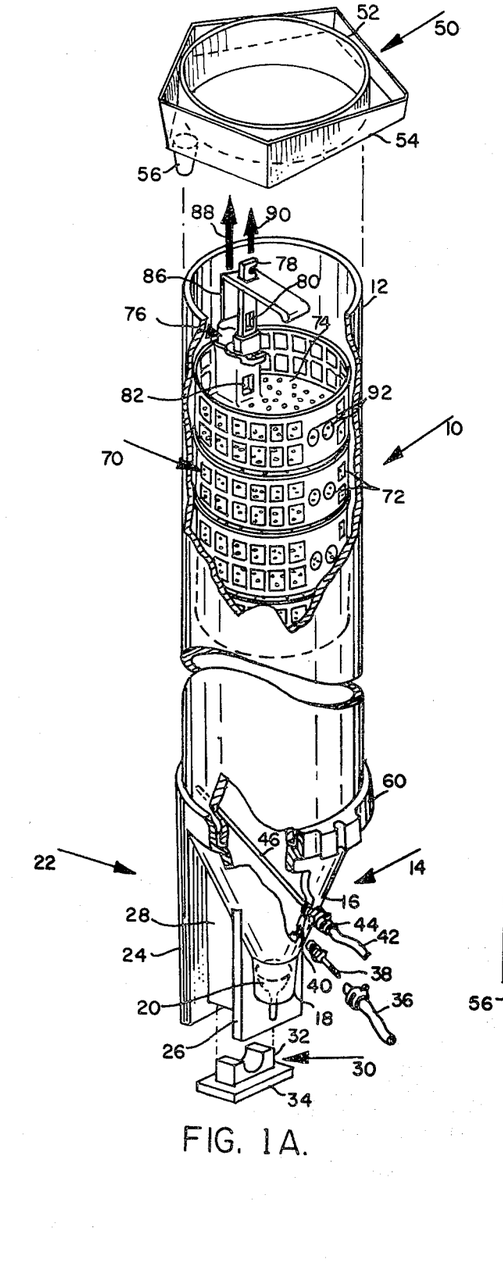
FIG. 1A is a diagrammatic, sectional, and exploded diagram illustrating one of the aquaculture rearing tanks.

Such a modular habitat is illustrated in FIG. 1A. In this figure, one of the modular units 10 is illustrated as including a vertically oriented vessel in the form of a transparent cylindrical portion 12 which is press fit into a tapered base 14, which in a preferred embodiment includes a frusto conical structure 16 and a dump conduit 18 which is sealed, in one embodiment, by a poppet valve illustrated in dotted fashion at 20. The base is configured so as to have a pedestal or foot 22 with leg portions 24 and 26 joined by a rib 28. This pedestal is positioned on a slotted base member 30 which carries a U-shaped channel member 32 on a base plate 34.

Water is introduced to base 14 via hose 36 and hose attaching fixture 38 which is mounted through orifice 40 in the base.

Air is introduced via hose 42 and fixture 44 which is connected to an aerator rod 46. In a preferred embodiment, aerator rod 46 is made from porous material with a central bore (not shown).

A skimmer 50 is press fit over the top of cylinder 12. The skimmer has an annular lip 52 and a sloped trough 54 as illustrated, with the outlet of the skimmer being illustrated at 56. In the embodiment of FIG. 1A the skimmer has a generally polyhedral outer configuration to permit an interlocking modular cluster arrangement with the tanks staggered as described in connection with FIG. 2.

Cylinder 12 may be exceedingly thin and designed to the hoop-stress limit since its circular cross section is maintained by virtue of an annular ring 60 which forms the top portion of base 14 and by annular lip 52 of skimmer 50. Note, thickness is not required to permit welding or machining.

This completes the description of the tank portion of the habitat. Within each tank is located a single, vertically stacked arrangement 70 of cages or animal rearing compartments per vessel, each of which may be in the form of a basket 72 in which a bottom portion 74 of one basket forms a closure for the basket immediately therebeneath. The basket is so configured so as to mate with strongback member 76 on which the baskets are supported. The strongback member not only supports the baskets, but also carries a feed rod 78 having compartments 80 in which food is carried, the size of these compartments being determined by the average size of the animals being fed. When the rod is inserted in the strongback and the baskets are appropriately located, an aperture 82 in the basket is in alignment with an aperture in the strongback member, through which food compartment 80 is exposed. Thus, animals within the various baskets may obtain food due to the alignment of the compartments of the feed rod with the apertures in both the strongback member and the baskets.

As illustrated by reference character 86, the strongback is provided with a lifting hook located over the center of gravity, which when raised in the direction of arrow 88, permits the simultaneous removal of all of the baskets within the tank. The stacked basket structure is, in general, removed when, for instance, one of the animals dies. This can be ascertained either by visual inspection through the tank wall or through the animals' health detecting system to be described in connection with FIG. 9. The baskets are also removed for harvesting and reloading the tanks.

Feed rod 78 is also removable by lifting it in the direction of arrow 90 which provides for a convenient method of feeding the animals in the various compartments. It is mandatory in an intensive culture system where animals are held individually, in which the animals are in different stages of of ecdysis (molting) and hence requiring individually differing amounts of food from day to day, that a means be provided to selectively remove uneaten food on a regular basis, to recycle food to the maximum possible extent for economic reasons and to minimize decaying organic material in the water environment. This feed rod concept conveniently provides these requirements.

It will be noted that each basket is provided with finger holes 92 to permit removal of the basket as will be described in connection with FIG. 3B.

Figure 1B:
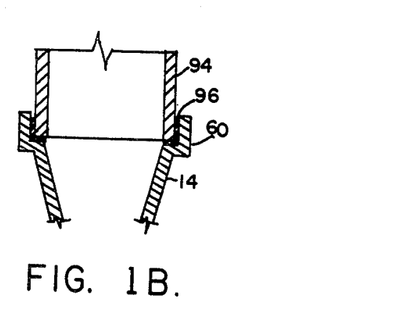
FIG. 1B illustrates in section the joining of the tank to the base.

Referring to FIG. 1B, the base of cylinder 12, illustrated at 94, is press fit into ring 60 of base 14 through the use of a compressible annular gasket 96. It will be appreciated that there are no weld connections, screw connections, or adhesive connections which simplifies the tank apparatus, makes it less expensive, lengthens its useful life and promotes serviceability. This type of apparatus is leak free due to the specialized gasket 96 illustrated in FIG. 1C.

Figure 1C:
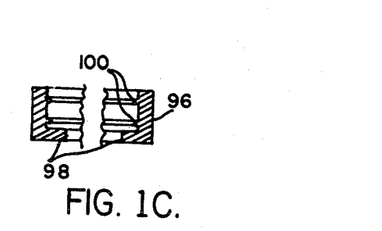
FIG. 1C is a sectional diagram illustrating the particular type of gasket utilized in the structure of FIG. 1B.

This annular gasket includes an inwardly flanged rubber member with the inward flange being illustrated at 98. A number of inwardly projecting annular ribs 100 are provided along the vertical rising portion of the annular seal which are compressed when the cylindrical tank is filled with water which urges the walls in an outward direction. This provides an unusually good seal and is all that is necessary in providing for a secure tank structure.

Figure 1D:
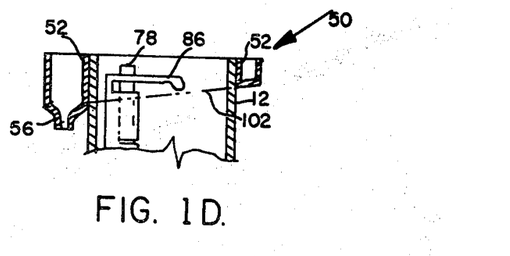
FIG. 1D is a sectional diagram illustrating in cross-section the skimmer of FIG. 1A.

Referring to FIG. 1D, in general, skimmer 50 has a sloped annular trough as illustrated by dotted line 102, and is sloped in the direction of the outlet 56. It will be appreciated that annular lip 52 completely surrounds the top portion of cylinder 12 such that a film of overflow water always exists at the top of the tank. This prevents bacteria and other airborne contaminants which would normally be present in the air from entering the water column and contaminating the habitats since it is immediately skimmed off from the top of the tank before it has a chance to penetrate into the tank. In addition, light particulate matter is raised to the top of the tank by air lift flotation and circulation so that this light particulate matter does not remain in the tank long enough to decay.

Heavy particulate matter and sludge drops to the bottom of the tank where, due to the tapered configuration of the base member, it is easily removed by the actuation of the poppet valve. It has been found that only a small amount of water need be withdrawn from the tank during a dump operation to remove all the solid waste at the bottom of the tank. Thus, it will be seen that the animals need not be removed from the tank in order to clean the tank. This in and of itself reduces the amount of trauma and stress to which the animals are subjected and therefore increases the yield.

It will also be appreciated that the upward flow of water and air provides the animals with fresh air and water on a continuous basis and the resultant mixing action provides for exceptionally uniform and precisely controlled water quality management. The water flow rate, the aeration rate and frequency of bottom dumping may be carefully controlled so as to provide for maximum growth of the animals without disease while at the same time minimizing pumping and makeup water heating energy.

Figure 2:
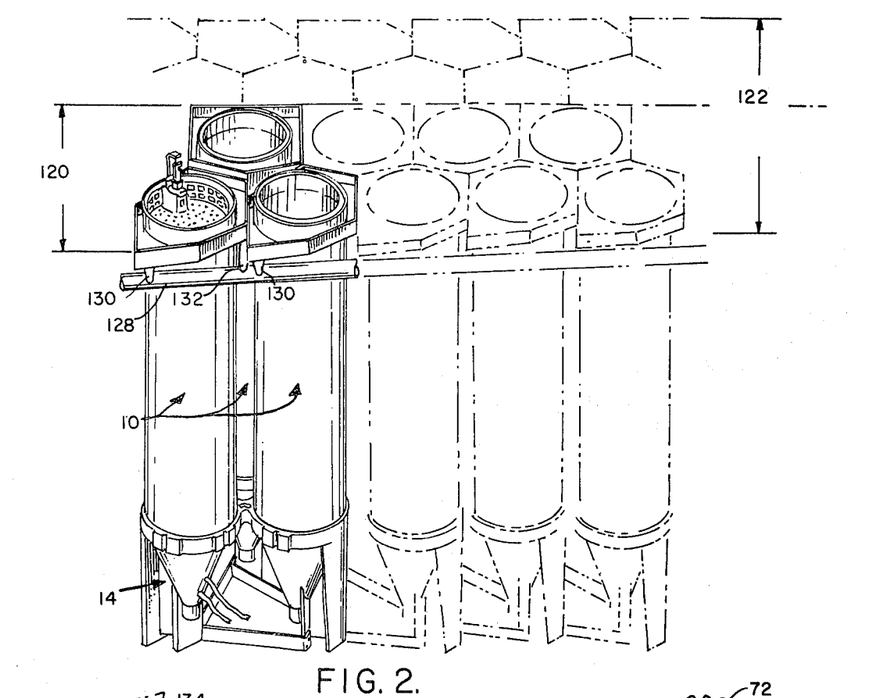
FIG. 2 illustrates a modular tripod mounting system for aquaculture tanks.

Referring to FIG. 2, the economics of the animal rearing system dictate that habitats 10 be as closely packed as possible in a staggered arrangement. In this figure, the triangular base 14 is more clearly shown. The triangular configuration is useful since all of the habitats in double row 120 have portions of the habitat visible for inspection from an aisle. In its most dense configuration two double rows of habitats are formed back to back as illustrated by arrow 122 with selected habitats having a pentagonal configuration as illustrated by reference character 124 and with the other habitats having a modified hexagonal configuration as illustrated at 126. In this figure a runoff conduit 128 is shown to which are attached skimmer outlets 130 from the hexagonal skimmers and outlets 132 from the pentagonal skimmers. These nested skimmers are clipped together at their mating surfaces to stabilize and lock together the tops of all tanks.

Figures 3A, 3B, 3C, 3D:
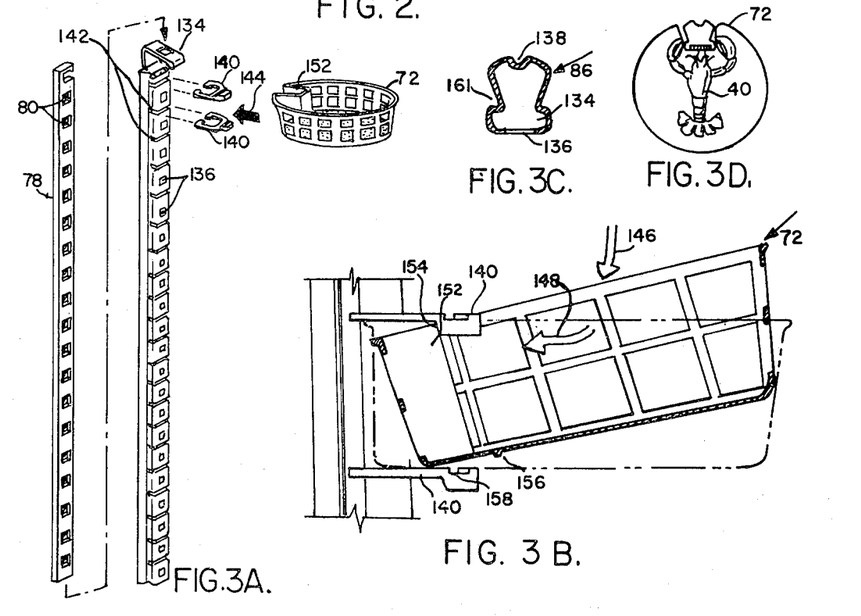
FIG. 3A illustrates the strong back and feed rod structure indicating the detents for holding of the individual baskets on the strongback member.
FIG. 3B illustrates the insertion of a basket into position on the strongback member.
FIG. 3C is a cross-sectional diagram of the strongback member of FIG. 3A.
FIG. 3D illustrates a lobster in its basket feeding from the feed rod through apertures in the basket and strongback member.

Referring to FIG. 3A, an exploded diagram of the feed rod and strongback structure is shown in which feed rod 78 is to be inserted into a channel 134 provided in strongback 86. As illustrated, the strongback has orifices 136 which are in alignment with feed rod compartments 80 when the feed rod is fully inserted. The strongback with an orifice is illustrated in cross section in FIG. 3C. As illustrated in FIG. 3C, strongback 86 also includes a locator groove 138 to insure proper feed rod orientation in each tank to permit mechanized insertion and removal of the feed rod.

As illustrated in FIG. 3D, an animal 140 located in the basket 72 has access to food in the compartment of the feed rod through aperture 136 in the strongback and aperture 82 in the basket.

Referring now to the mounting of the basket on the feed rod, as illustrated in FIG. 3A, basket 72 is inserted between two snap-on detents 140 which are located by the grooves 142 in strongback 86. With these detents in place, movement as illustrated by arrow 144 in FIG. 3A and arrows 146 and 148 in FIG. 3B results in basket 72 hooking under the topmost detent 140. This is accomplished by the top lip 152 of the innerface of the basket's mating recess which permits the insertion of the basket around the strongback. When the basket is in place in the upper detent, it is lowered by pivoting on the upper detent until dimple 156 is located in groove 158 of the bottom detent when the basket is fully in place. Removal of the basket merely reverses the above procedure.

Figure 4:
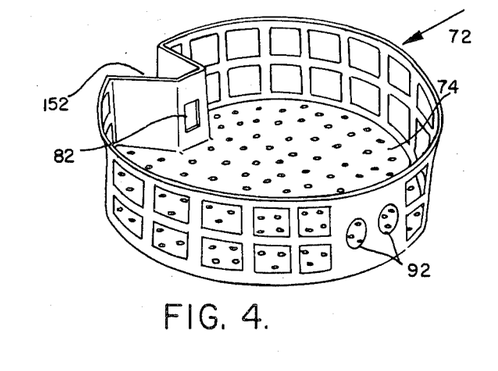
FIG. 4 is an illustration of one type basket utilizable in the subject invention.
Figure 5A:
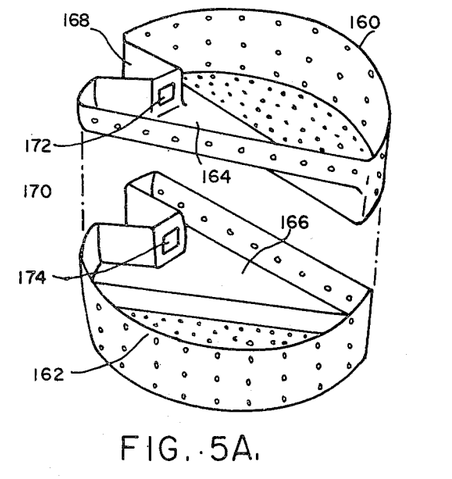
FIGS. 5A, 5B and 6 illustrate a half basket configuration showing a shelf and a nested arrangement in which apertures in the baskets and the strongback member expose corresponding compartments in the feed rod, with the nesting of the habitats providing covers for the habitats immediately below.
Figure 5B:
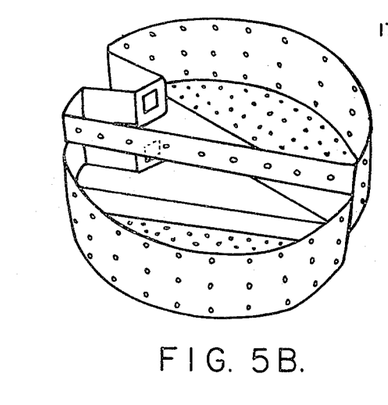

Referring to FIG. 4, a basket for rather large animals is illustrated and has the same configuration as basket 72 of FIGS. 1A and 3A and 3B;

Referring to FIGS. 5A and 5B, for smaller animals, a so-called "half basket" structure is utilized which includes a right hand basket 160 superimposed or nested over a left hand basket 162. Each of these baskets has a shelf portion 164 and 166 respectively. It has been found that these baskets are optimumly designed to accommodate growth, since the animal has ample room for movement, molting and feeding. Both the right hand "half basket" and the left hand "half basket" have inwardly projecting recesses 168 and 170 respectively which mate with the strongback member and have apertures 172 and 174 respectively which communicate with apertures in the strongback member so as to permit the delivery of food to each half basket structure. Each "half basket" has its own locking detent which engages the anterior groove in the strongback (161 FIG. 3C) and thereby permits individual insertion or removal.

As illustrated in FIG. 5A, the half baskets are shown in exploded form and in FIG. 5B, they are shown in a stacked arrangement.

Figure 6:
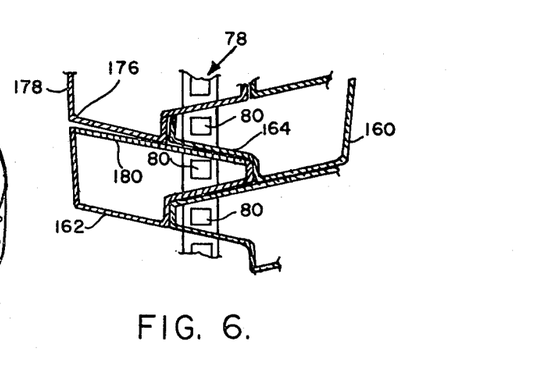

In order to more fully understand the stacking arrangement, referring now to FIG. 6, it will be appreciated that a left hand basket 162 is partially covered by a superimposed right hand basket 160 at least to the extent of shelf portion 164. A bottom portion 176 of a still further superimposed left hand half basket 178 forms an additional cover for basket 162. Alternatively, a separate cover 180 may be provided for either the right hand or left hand half basket, and is highly desirable when working with smaller animals.

As can be seen, the compartments of feed rod 78 are exposed through to the interior of each half basket.

Figures 7A, 7B:
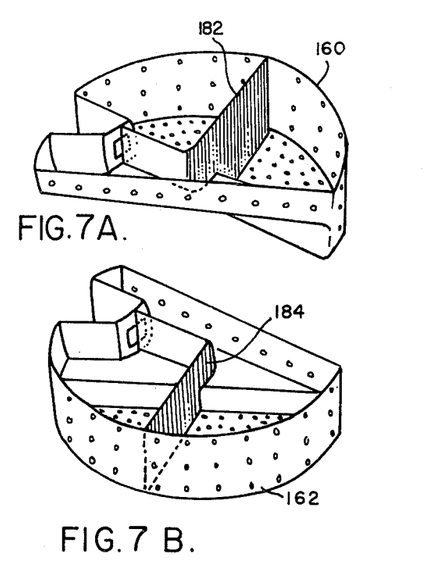
FIG. 7A illustrates one half basket structure which is further subdivided by divider to accommodate smaller animals.
FIG. 7B illustrates the opposing half basket also provided with a divider.

Referring to FIGS. 7A and 7B, the half baskets may be further subdivided for the rearing of even smaller animals by snapped in inserts 182 and 184 respectively. This completes the description of the modular habitat structure which has provided extremely efficient and high density rearing of aquatic animals which must be kept separated during the rearing process. What is now described is a method of transfer of the baskets while maintaining the animals alive and a method of ascertaining the health, size, and therefore growth of the animals by ascertaining the history of food consumed by each individual animal during a given time period.

LIFE MAINTAINING TRANSPORT SYSTEM

As mentioned hereinbefore, it is sometimes necessary to transfer the animals to or from the aquaculture tank and another location. It is also desirable that the animals not only be kept alive, but also be subjected to as little stress and trauma as possible. In order to accomplish this, and referring to FIG. 8A, stacks of baskets 200 may be suspended from the lifting hooks on the strongback members via lifting rods 202 which are affixed to a frame generally indicated by 204. Frame 204 is suspended by a hoist 206 on an overhead traveler 208.

Figure 8A:
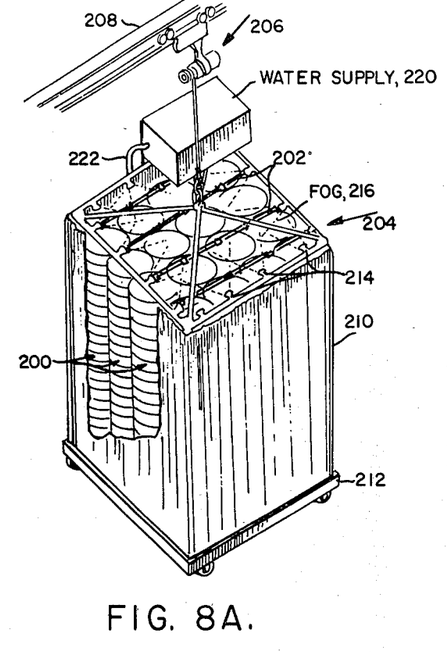
FIG. 8A illustrates an overhead conveyor type transport of the stacked habitats illustrating the use of foggers and a shroud to promote animal respiration during transfer.

A shroud 210, shown partly cutaway, depends downwardly from frame 204 and surrounds the stacks of baskets 200, so as to confine the high humidity. In one embodiment, frame 204 may extend to the floor and include a wheeled base member 212 as shown.

Figure 8B:
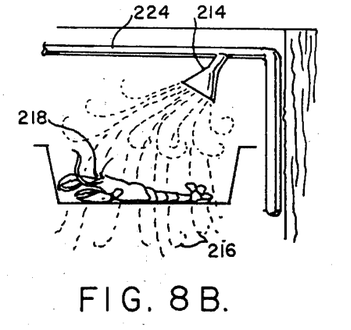
FIG. 8B illustrates diagrammatically a fogger and an animal within a basket.

In one embodiment, frame 204 is provided with a plurality of conventional fog nozzles 214 which produce a fog generally indicated at 216. This fog is suspended by convection within the shroud and surrounds the animals carried in the baskets. This is illustrated in FIG. 8B.

It is a finding of this invention that animals can, in fact, be transferred in a fog rather than in a liquid medium and maintain their health over significant periods of time. In essence, the fog moistens the animal's gill surfaces promoting oxygen transfer to the bloodstream. This is an unexpected finding and serves as a basis for one of the subject inventions.

The fog is generated, as mentioned before, by conventional fog nozzles which, in one embodiment, are fed from a water supply 220 which supplies water through a hose 222, and through frame 204 which may include hollow conduits 224 to which fog nozzles 214 are coupled. In the illustrated embodiment, the water supply is under pressure and is attached to frame 204. Alternatively, flexible lines may connect the conduits of frame 204 to a suitable water supply.

It will therefore be appreciated that what has been provided is a method of transporting aquatic animals in which the animals may be kept alive by moist air as opposed to immersing them in an aequous medium. Thus, what is provided is both a method and apparatus for the maintaining of aquatic animals alive by the use of a fog and a fog generating apparatus.

ANIMAL HEALTH AND GROWTH INDICATOR

Figure 9:
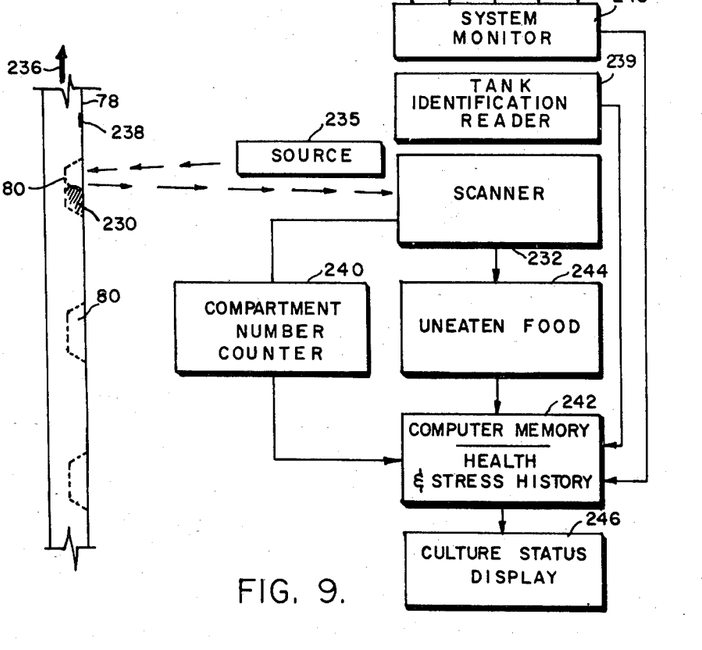
FIG. 9 illustrates diagrammatically a scanning beam analyzer for monitoring the food consumed so as to monitor animal health and size.

As mentioned hereinbefore and referring to FIG. 9, animal health and growth may be determined by monitoring the amount of food consumed in a given time period. As illustrated in FIG. 9, feed rod 78 has a number of compartments 80, one of which is illustrated as having an amount of uneaten food remaining, here illustrated at 230. It will be appreciated that over a given time period, the animal health and animal growth may be monitored by the amount of food that is eaten by the animal and conversely, by scanning the amount of food that remains in the feed rod each day. It is the purpose of this portion of the invention to ascertain the amount of food not eaten, to correlate it with the animal and to display a record of the animal's health so that animals which are, in general, not growing as expected can be either treated or removed from their habitat.

In order to ascertain the amount of food not eaten, a conventional electro-optic scanning beam available from any of a number of suppliers may be employed. The purpose of the scanning beam is to provide a return indication 234 whose amplitude is proportional to the amount of food remaining in a given compartment. Since the scanner works on the reflectance principle, the feed rod material is chosen to be contrasting to that of the food. Depending on the relative reflectance, the amount of food remaining in the compartment can be ascertained by the amplitude of the returned signal. In one embodiment, rod 78 is moved upwardly as indicated by arrow 236 past beam 233 from source 235. Initially, a tank identification indicating region 238 is scanned by unit 239 to identify which tank (e.g. which rod) is being read. Region 238 may utilize a conventional bar code which is optically scannable. The identity of the compartment is determined by a conventional ring counter 240, the output of which is combined with food consumption data in computer memory 242.

As rod 78 moves upwardly, the compartment is counted and the time average amplitude of the signal from scanning beam analyzer 232 is converted into a number reflecting the food not eaten by a conventional device 244 which may include a conventional lookup table type arrangement. The output of device 244 is stored in memory 242 simultaneously with the compartment number, tank number and output of a system monitor 243 so as to provide historical data accessible at any time on the health of the animals in any basket tank or system. Note, system monitor 243 may monitor pH, dO, $NH_3$, temperature and recirculation. If there is a significant indication of a problem, an output display 246 may be actuated so that the animal or group of animals affected may either be appropriately treated, or harvested before predicted death.

By keeping a history of the food consumed, it is possible to correlate the results with the size of the animal and its predicted growth pattern. Thus, the growth and health of animals may be ascertained without visual inspection which, it will be appreciated, is extremely time consuming even without removing the animals from the aqueous medium. Visual inspection is also confounded because the aqueous medium distorts the size of the animal depending on where the animal is within the water-filled transparent tank.

This then provides an improved method of ascertaining animal health and animal growth without the necessity of removing the animal from the aquaculture tank and, in general, is preferable to visual inspections taken through the tank walls themselves.

Although preferred embodiments of the invention have been described in considerable detail for illustrative purposes, many modifications will occur to those skilled in the art. It is therefore desired that the protection afforded by Letters Patent be limited only by the true scope of the appended claims.

I claim:

1. Apparatus for the rearing of aquatic animals comprising:

a tank including a vertically oriented vessel; and a single vertically stacked arrangement of animal rearing compartments per vessel, each compartment being in the form of a basket of a diameter less than the inside diameter of said vessel and having a recess at one position thereof, said stacked arrangement including a strongback member with each basket in part surrounding said strongback member and means for removably mounting said baskets to said strongback member, said baskets being removeably mounted at one position at the edge thereof, said strongback member having an internal channel adapted to receive a feed rod with a multiplicity of food compartments therein, said strongback member having a number of apertures corresponding in position to the compartments in said feed rod when said rod is in place, said recessed portion of the basket having an aperture which is in alignment with the corresponding aperture in said strongback member adjacent the mounting position of said basket.

2. Apparatus for the rearing of aquatic animals comprising:

a tank including a vertically oriented vessel, a tapered base member at one end of said vessel, said base member having an outlet at the tapered end, and a skimmer surrounding the top of said vessel, said vessel being pressed fit into said base member, said base member further including a first support member extending downwardly from the tapered end and a second support member extending downwardly from the non-tapered upper end, both support members terminating in the same horizontal plane beneath said tapered end, said base member also including a rib between first and second support members, and a mounting base including a flat plate and an upwardly extending U-shaped member, said U-shaped member having a configuration adapted to receive the bottom edge of said rib; and a single vertically stacked arrangement of animal rearing compartments per vessel, each compartment being in the form of a basket of a diameter less than the inside diameter of said vessel, said stack arrangement including a strongback member for removeably mounting said basket to said strongback member.

3. Apparatus for the rearing of aquatic animals comprising:

a tank including a vertically oriented vessel, a tapered base member at one end of said vessel, said base member having an outlet at the tapered end, a skimmer surrounding the top of said vessel and an annular gasket between said base member and said vessel, said gasket having an inward flange at its base and having annular inwardly projecting ribs on the vertically rising portion of said gasket; and a single vertically stacked arrangement of animal rearing compartments per vessel, each compartment being in the form of a basket of a diameter less than the inside diameter of said vessel, said stacked arrangement including a strongback member and means for removably mounting said baskets to said strongback member.

4. Apparatus for the rearing of aquatic animals comprising:
a tank including a vertically oriented vessel; and
a single vertically stacked arrangement of animal rearing compartments per vessel, each compartment being in the form of a basket of a diameter less than the inside diameter of said vessel, such stacked arrangement including a single strongback member and means for removably mounting said baskets to said strongback member, said baskets being recessed at one position such that each basket in part surrounds said, strongback member and said baskets being removably mounted at said one position at the edge thereof.

5. Apparatus for the rearing of aquatic animals comprising:
a tank including a vertically oriented vessel; and
a single vertically stacked arrangement of animal rearing compartments per vessel, each compartment being in the form of a basket of a diameter less than the inside diameter of said vessel, said stacked arrangement including a single strongback member and means for individually and randomly removably mounting said baskets to said strongback member such that any of said animal rearing compartments may be removed from said strongback member without removing any others of said animal rearing compartments, said baskets being removably mounted at one position at the edge thereof.

6. The apparatus of claim 5 wherein said baskets are half baskets and are nested.

7. The apparatus of claim 6 wherein said half baskets have shelves disposed therein.

8. The apparatus of claim 5 wherein said tank includes a tapered base member at one end of said vessel, said base member having an outlet at the tapered end, and a skimmer surrounding the top of said vessel.

9. The apparatus of claim 8 wherein said vessel is press fit into said base member.

10. The apparatus of claim 5 and further including a skimmer surrounding the top of said tank.

11. The apparatus of claim 10 wherein said skimmer has a polyhedral outer shape so as to permit modular clustering of said tanks.

12. The apparatus of claim 5 wherein said skimmer includes an inner wall of a size adapted to be press fit around the top of said vessel, an outer wall having a polyhedral shape, a sloped trough joining said two walls, and an outlet port at the lowest part of said sloped trough.

* * * * *